United States Patent [19]

Thompson

[11] Patent Number: 4,746,149
[45] Date of Patent: May 24, 1988

[54] COUPLER FOR WATER LINE

[76] Inventor: Albert L. Thompson, Rt. 1, Box 180,, West Hamlin, W. Va. 25571

[21] Appl. No.: 70,398

[22] Filed: Jul. 7, 1987

[51] Int. Cl.[4] .............................................. F16L 55/00
[52] U.S. Cl. .................................... 285/175; 285/361
[58] Field of Search ............... 285/361, 376, 396, 402, 285/175

[56] References Cited

U.S. PATENT DOCUMENTS

| 155,268 | 9/1874 | Stocker et al. | 285/361 |
| 906,217 | 12/1908 | Gaylord | 285/376 X |
| 1,890,011 | 12/1932 | Wirz et al. | 285/376 X |

FOREIGN PATENT DOCUMENTS

| 1113831 | 4/1956 | France | 285/361 |
| 28930 | of 1910 | United Kingdom | 285/376 |

Primary Examiner—Dave W. Arola
Attorney, Agent, or Firm—John F. C. Glenn

[57] ABSTRACT

A pair of slot-and-stud connected coupler units for use between water conduits such as a garden hose and faucet. An O-ring seal prevents escape of water between the units and also frictionally resists relative movement between them.

3 Claims, 2 Drawing Sheets

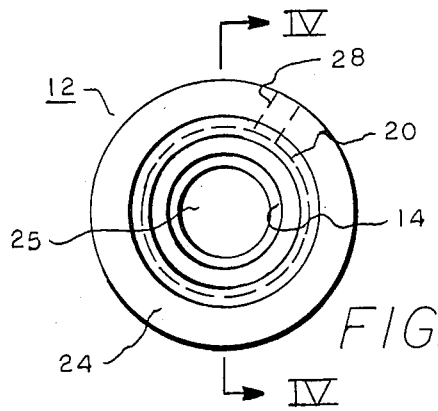
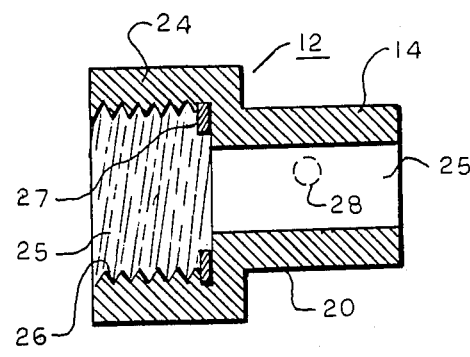
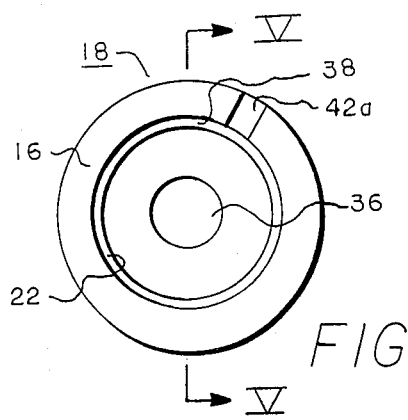
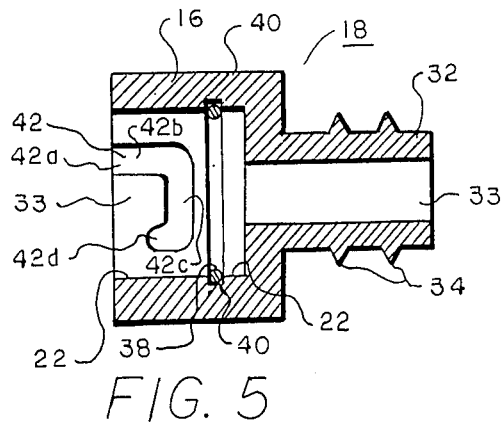
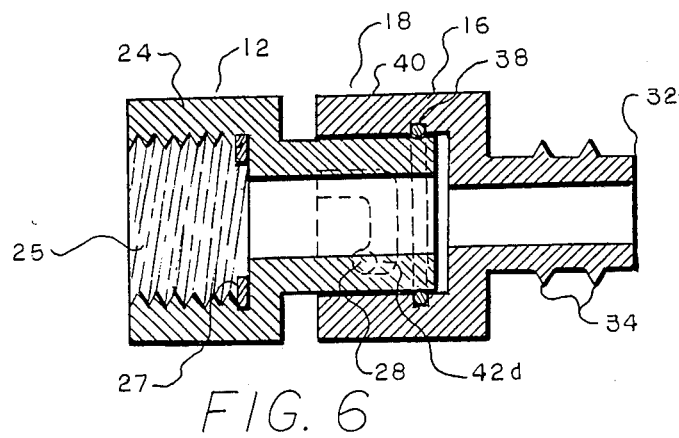

COUPLER FOR WATER LINE

BACKGROUND OF THE INVENTION

Quick-disconnect couplings have long been developed for use between a water faucet and a hose end or between two hose ends, as shown, for example, in Class 285, Subclasses 33, 248, 249, 252, 360, 361 and 376.

The disconnectable connection between the two elements of such couplings is usually based on a combination of a disconnectable lock with an elastomeric gasket. However, leaks and other difficulties, especially after extended use, have remained a problem, as many gardeners are aware.

SUMMARY OF THE INVENTION

The present invention provides a coupling having a pair of male and female elements which have a bayonet-type connection so that they are convenient to connect and disconnect to and from each other after their opposite ends are attached to a pair of hose ends or a faucet and a hose end. An elastomeric O-ring gasket is mounted between the coupling elements for the dual purpose of sealing against water leakage and frictionally engaging and sliding around and along the other element in cooperation with the bayonet locking action. The only pressure put on the O-ring is the relatively slight pressure necessary for frictional engagement when no water pressure is applied within the coupling, plus such pressure as may result from the pressure of water on the O-ring. No spring is needed, thus avoiding a common complication and expense.

Other embodiments, details and advantages of the invention will become apparant as the following disclosure proceeds.

BRIEF DESCRIPTION OF THE DRAWINGS

The accompanying drawings semi-diagramatically illustrate the present preferred embodiment of the invention, in the following figures:

FIG. 2 shows an end view of the coupling element shown on the left of FIG. 1, as viewed from the left side of FIG. 1;

FIG. 3 shows an end view of the coupling element on the right of FIG. 1, as viewed from the left side of FIG. 1;

FIG. 4 shows a section on the line IV—IV in FIG. 2;

FIG. 5 shows a section on the line V—V in FIG. 3; and

FIG. 6 corresponds to FIGS. 4 and 5 but shows the two coupling elements in their locked-together position.

DETAILED DESCRIPTION OF PRESENT PREFERRED EMBODIMENT

Figure 1:
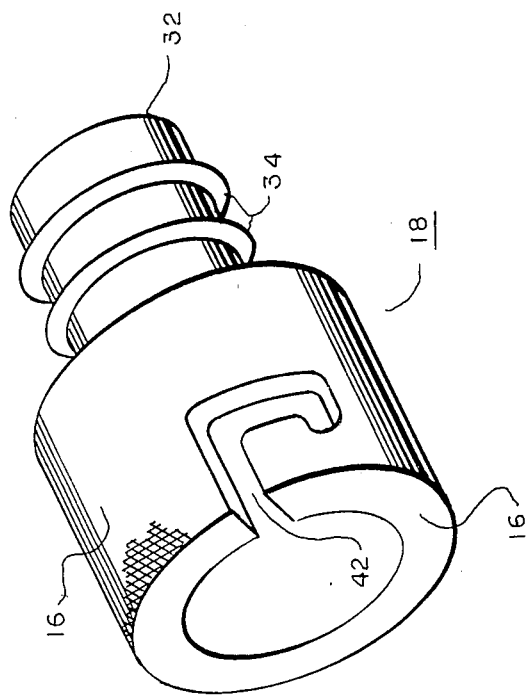
FIG. 1 is an isometric perspective view of a pair of separated coupling elements embodying the invention.
Figure 1:
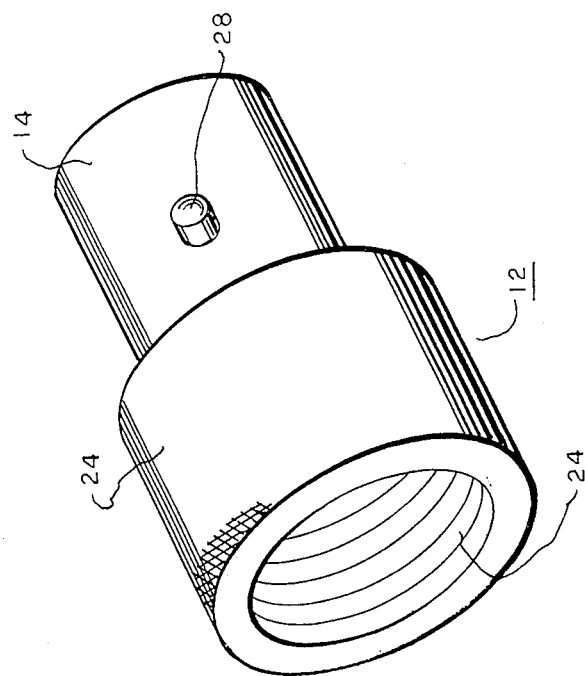

Referring now more particularly to the drawings, and initially to FIGS. 1, 4 and 5, a coupling element 12 has a male end 14 which is disconnectably connectable to the female end 16 of a coupling element 18. The coupling ends 14 and 16 are in the form of hollow cylinders, and end 14 has a smooth outer cylindrical surface 20 which is adapted to fit closely within and move slidably along a smooth inner cylindrical surface 22 of coupling end 16.

Element 12 has an opposite end 24 in the form of a hollow cylinder which is coaxial with male end 14 and integrally joined to it to provide a continuous straight internal passage 25 through ends 14 and 24 and thus entirely through element 12. End 24 has internal spiral threads 26 adapted to screw around external threads of a faucet or hose fitting (not shown). A washer 27 inside end 24 seals it against said faucet or hose fitting.

A stud 28 is fixed to the coupling end 14 and projects radially from its outer cylindrical surface 20. The base of stud 28 may be entirely within an adjacent portion of the wall of coupling end 14, as illustrated. However, for convenience of manufacture and for reinforcement, the inner end of stud 28 may project across passageway 25 to the opposite side of coupling end 14, if resultant interference with flow through passageway 25 is not considered to be a significant problem.

Element 14 has an end 32 in the form of a hollow cylinder which is coaxial with the opposite coupling end 16. The ends 16 and 32 are integrally joined and provide a continuous straight passageway 33 entirely through them and thereby through element 14. External circular ridges 34 around the outside of end 32 are adapted to grip the inside of an elastomeric hose end (not shown). The ridges 34 may be replaced by spiral threads adapted to screw into a female threaded fitting on a hose end or faucet.

A resiliant O-ring 38 is mounted in a circular groove 40 around the inside of coupling end 18, so that only a minor portion of the O-ring extends out of the groove into the space defined by the inside surface 22. Groove 40 interrupts surface 22 at a position spaced from but near the inner end of surface 22. The outside of the outermost end of male coupling end 14 has a bevelled surface 41 to facilitate entry into female coupling end 16 and to avoid injury to O-ring 38 when the bevelled end reaches O-ring 38 in the course of its movement into coupling end 14.

A substantially J-shaped slot 42 opens radially through the coupling end 16 to receive stud 38. Slot 42 extends in a path which begins at an open end 42a when coupling end 14 is initially inserted in coupling end 16. From its open end 42a slot 42 has a section 42b extending lengthwise coupling end 16 (preferably parallel to its central axis), for a distance sufficient to allow bevel 41 and the leading end of outer surface 20 to slide past and beyond O-ring 38 and cause O-ring to be positioned around surface 20 when elements 12 and 14 are locked together. The path of slot 42 then turns into a section 42c extending along a minor portion (about an eighth of the circumference of coupling end 14), and finally turns into a final section 42d which extends back a short distance (at least about equal to the diameter of stud 28) toward the projecting end of coupling end 16.

Once stud 28 is in the final length 42d of slot 42, it will be urged toward the closed end of section 42d by pressure of water confined in the passageways 25 and 33 and prevented from escaping between the elements 12 and 14 by the sealing action of O-ring 38. In the absence of water pressure the close fit between the interengaging surfaces 20 and 22 of coupling ends 14 and 16, the engagement of stud 28 with the closed end of slot section 42d, and the frictional engagement of O-ring against surface 20 all tend to hold elements 12 and 14 together until a person decides to move them manually relative to each other, rotationally and lengthwise, in a manner causing stud 28 to move along slot 42 until it exits from its open end 42a.

The position of O-ring 38 in female coupling end 16 has the advantage of sheltering it from exposure to sand and dirt when the element 18 is mounted on a hose end while uncoupled from element 12. The outer surface 20 of the male coupling end 14 is smooth and unbroken and hence not likely to pick up dirt and sand while the elements 12 and 18 are uncoupled from each other.

The largest outer diameter of the coupling element 12 (that of its outer end 24) is preferably made equal to that of the largest diameter of coupling element 18 (that of its coupling end 16) and the projection of stud 28 from surface 20 preferably does not extend beyond this diameter, in order to provide a coupling and a conveniently compact and uniform profile along most of its length. This presents minimum opportunity of snagging when the coupling connects a pair of hoses being dragged lengthwise along the ground.

I claim:

1. A coupling for detachably connecting two water conduits such as a garden hose to another garden hose or water connection, comprising first and second units each having a pair of oppositely extending male and female tubular ends each suitable for mating connection, the female end of each unit being of larger outside diameter than the outside diameters of the male ends of the units and substantially of the same diameter as the female end of the other unit, the female end of the first unit being internally threaded for connection with an externally threaded hose fitting or faucet, the female end of the second unit having an elongated internal cylindrical surface extending from the outer extremity of the second unit's female end, the male end of the first unit having an elongated external cylindrical surface adapted to slide within and against said internal cylindrical surface, the second unit's female end having a slot and a separate groove which interrupt its said cylindrical surface, said groove being indented into and extending circumferentially around the inside of the second unit's female end between the slot and the innermost end of said internal cylindrical surface, an elastic O-ring seated in the groove, a portion of the O-ring being engageable with and compressible against said internal cylindrical surface, the slot extending from the outer extremity of the second unit's female end initially along part of the length of the second unit's female end and then partly around its circumference, and a stud extending radially outwardly from said outer cylindrical surface, the stud being adapted to enter and move along the slot when the first unit's male end is pressed into the second unit's female end and then twisted to bring the stud into the circumferential portion of the slot to lock the units together, and the O-ring being effective not only to control escape of water between the said internal and external cylindrical surfaces but also to grip said external cylindrical surface and thereby frictionally oppose relative movement of the units and thus movement of the stud out of its locking position until the units are disconnected by manual override of the O-ring's frictional grip.

2. A coupling according to claim 1, in which the slot extends entirely through the wall of the second unit's female end and follows a substantially J-shaped path, and in which the stud projects no further than the thickness of said wall.

3. A coupling according to claim 2 in which the O-ring is a circle in cross-section and is solid across its cross-section.

* * * * *